United States Patent
Bai et al.

(10) Patent No.: US 10,679,650 B2
(45) Date of Patent: Jun. 9, 2020

(54) CURRENT-ASSISTED MAGNETIC RECORDING WRITE HEAD WITH IMPROVED WRITE GAP STRUCTURE

(71) Applicant: Western Digital Technologies, Inc., San Jose, CA (US)

(72) Inventors: Zhigang Bai, Fremont, CA (US); Venkatesh Chembrolu, Fremont, CA (US); Yaguang Wei, Pleasanton, CA (US); Terence Lam, Cupertino, CA (US); Michael Kuok San Ho, Emerald Hills, CA (US); Lijie Guan, San Jose, CA (US); Suping Song, Fremont, CA (US); Supradeep Narayana, Santa Clara, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/277,953

(22) Filed: Feb. 15, 2019

(65) Prior Publication Data
US 2020/0005815 A1    Jan. 2, 2020

Related U.S. Application Data

(63) Continuation of application No. 16/191,309, filed on Nov. 14, 2018, now abandoned, which is a
(Continued)

(51) Int. Cl.
*G11B 5/235* (2006.01)
*G11B 5/23* (2006.01)
(Continued)

(52) U.S. Cl.
CPC ............ *G11B 5/235* (2013.01); *G11B 5/1278* (2013.01); *G11B 5/23* (2013.01); *G11B 5/314* (2013.01); *G11B 5/315* (2013.01); *G11B 5/3146* (2013.01)

(58) Field of Classification Search
None
See application file for complete search history.

(56) References Cited

U.S. PATENT DOCUMENTS 6,665,136 B2    12/2003 Clinton et al.
7,072,142 B2    7/2006 Lam
(Continued)

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

Mallory, Mike et al; "Head and Media Challenges for 3 Tb/in2 Microwave-Assisted Magnetic Recording"; IEEE Transactions on Magnetics, vol. 50, No. 7, Jul. 2014 (8 pages).

*Primary Examiner* — Craig A. Renner
(74) *Attorney, Agent, or Firm* — Patterson & Sheridan, LLP; Steven Versteeg (57) ABSTRACT

A current-assisted magnetic recording write head has an electrically conductive layer in the write gap between the write pole and the trailing shield. Electrical circuitry directs current from the write pole, through the conductive layer, to the trailing shield. The current through the conductive layer generates an Ampere field substantially orthogonal to the magnetization in the write pole to assist magnetization switching of the write pole. The write head's magnetic throat height ($TH_m$) is substantially the thickness of the trailing shield at the write gap, while the write head's electrical throat height ($TH_e$) is substantially the height of the con-
(Continued)

ductive layer in the write gap. In embodiments of this invention, the signal-to-noise ratio (SNR) of the readback signal and the soft error rate (SER) of the recorded data can be improved with a write gap structure wherein $TH_e$ is greater than $TH_m$.

20 Claims, 6 Drawing Sheets

Related U.S. Application Data continuation of application No. 16/146,110, filed on Sep. 28, 2018, now abandoned.

(60) Provisional application No. 62/572,177, filed on Oct. 13, 2017.

(51) Int. Cl.
    *G11B 5/127* (2006.01)
    *G11B 5/31* (2006.01)

(56) References Cited

U.S. PATENT DOCUMENTS

| | | |
|---|---|---|
| 7,149,055 B2 | 12/2006 | Clinton et al. |
| 7,983,002 B2 | 7/2011 | Pust et al. |
| 8,116,031 B2 | 2/2012 | Alex et al. |
| 8,411,390 B2 | 4/2013 | Franca-Neto et al. |
| 8,422,159 B2 | 4/2013 | Gao et al. |
| 8,582,240 B1 | 11/2013 | Chen et al. |
| 9,230,571 B1 | 1/2016 | Chen et al. |
| 9,230,573 B1 * | 1/2016 | Etoh et al. ............. G11B 5/314 |
| 9,275,672 B2 | 3/2016 | Shiroishi et al. |
| 9,368,135 B2 | 6/2016 | Gao |
| 9,881,637 B1 | 1/2018 | Wilson et al. |
| 10,121,497 B1 | 11/2018 | Takahashi et al. |
| 10,186,284 B2 | 1/2019 | Narita et al. |
| 10,236,021 B2 | 3/2019 | Narita et al. |
| 10,276,193 B2 | 4/2019 | Narita et al. |
| 10,325,618 B1 | 6/2019 | Wu et al. |
| 10,366,714 B1 | 7/2019 | Olson et al. |
| 2008/0117545 A1 | 5/2008 | Batra et al. |
| 2008/0304176 A1 | 12/2008 | Takagishi et al. |
| 2009/0059423 A1 | 3/2009 | Yamada et al. |
| 2009/0310244 A1 | 12/2009 | Shimazawa et al. |
| 2013/0250456 A1 | 9/2013 | Yamada et al. |
| 2014/0139952 A1 | 5/2014 | Takeo et al. |
| 2014/0177100 A1 | 6/2014 | Sugiyama et al. |
| 2016/0027455 A1 | 1/2016 | Kudo et al. |
| 2017/0236537 A1 | 8/2017 | Murakami et al. |
| 2018/0268848 A1 | 9/2018 | Narita et al. |
| 2019/0088274 A1 | 3/2019 | Narita et al. |

\* cited by examiner

CURRENT-ASSISTED MAGNETIC RECORDING WRITE HEAD WITH IMPROVED WRITE GAP STRUCTURE

CROSS-REFERENCE TO RELATED APPLICATIONS

This application is a continuation of U.S. patent application Ser. No. 16/191,309, filed Nov. 14, 2018, which application is a continuation of U.S. patent application Ser. No. 16/146,110, filed Sep. 28, 2018, which application claims benefit of U.S. Provisional Patent Application Ser. No. 62/572,177, filed Oct. 13, 2017, both of which are herein incorporated by reference.

BACKGROUND

Field of the Invention

This invention relates generally to magnetic recording systems, and more particularly to a magnetic recording system with a current-assisted write head.

Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. The write head must be able to write data not only at high bit density but also at high data rates. The write speed is particularly important in enterprise disk drives. However, the time for the main pole of the write head to switch from one magnetization direction to the other is a limiting factor as the data rate is increased. At high data rates, the available magnetic flux from the write head, as seen by the recording layer on the disk, is dominated by the low-frequency flux output of the write head. The reason for such loss of write flux includes a slow intrinsic time-constant of the magnetization reversal in the main pole of the write head.

Various techniques have been proposed to increase the magnetization switching speed of the perpendicular write head. One technique is current assistance, wherein a separate electrical current source is used to generate a magnetic field that assists the magnetization reversal. U.S. Pat. No. 8,116,031 B2, assigned to the same assignee as this application, describes a write head with an auxiliary coil and current source that generates a magnetic field orthogonal to the write pole to apply a torque to the write pole magnetization and thereby facilitate magnetization switching. U.S. Pat. No. 7,072,142 B2, also assigned to the same assignee as this application, describes a write head with a magnetic bias field orthogonal to the magnetization of the write pole. The bias field may be generated by current in a separate electrical path adjacent the write pole and applies a torque to the write pole magnetization to facilitate switching.

SUMMARY

The prior art current-assisted write heads can be difficult to fabricate because they require a separate electrical coil and/or a separate electrical current path.

Embodiments of this invention relate to a current-assisted magnetic recording write head wherein an electrically conductive layer is in the write gap between the write pole and the trailing shield. Electrical circuitry directs current from the write pole, through the conductive layer, to the trailing shield. The current through the conductive layer generates an Ampere field substantially orthogonal to the magnetic flux in the write pole to assist magnetization switching of the write pole.

In embodiments of this invention, the write head's magnetic throat height ($TH_m$) is substantially the thickness of the trailing shield at the write gap as measured from the gas-bearing surface (GBS) to an end recessed from the GBS, while the write head's electrical throat height ($TH_e$) is substantially the height of the conductive layer in the write gap as measured from the GBS to an end recessed from the GBS. In embodiments of this invention, it has been discovered that the signal-to-noise ratio (SNR) of the readback signal and the soft error rate (SER) of the recorded data can be improved with a write gap structure wherein $TH_e$ is greater than $TH_m$.

For a fuller understanding of the nature and advantages of the present invention, reference should be made to the following detailed description taken together with the accompanying figures.

DETAILED DESCRIPTION

Figure 1:
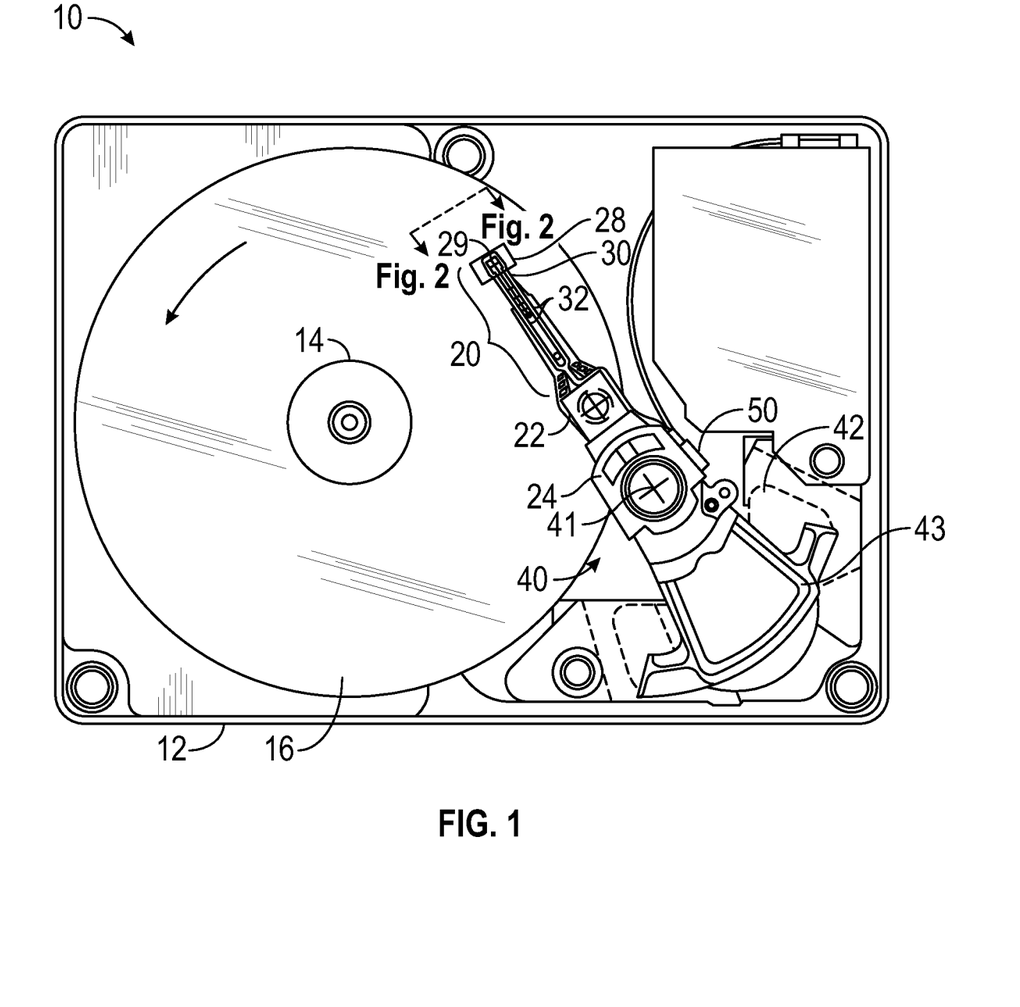
FIG. 1 is a top plan view of a conventional head/disk assembly of a hard disk drive with the cover removed that may function as a current-assisted magnetic recording disk drive according to embodiments of the invention.

FIG. 1 is a top plan view of a conventional head/disk assembly of a hard disk drive with the cover removed that may function as a current-assisted magnetic recording disk drive according to embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow on disk 16. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to a gas-bearing slider 28. A magnetic recording read/write head 29 is located at the end or trailing surface of slider 28. In embodiments of this invention the write head 29 incorporates an electrically-conductive layer in the write gap. The flexure 30 enables the slider 28 to "pitch" and "roll" on a gas-bearing (typically air or helium) generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
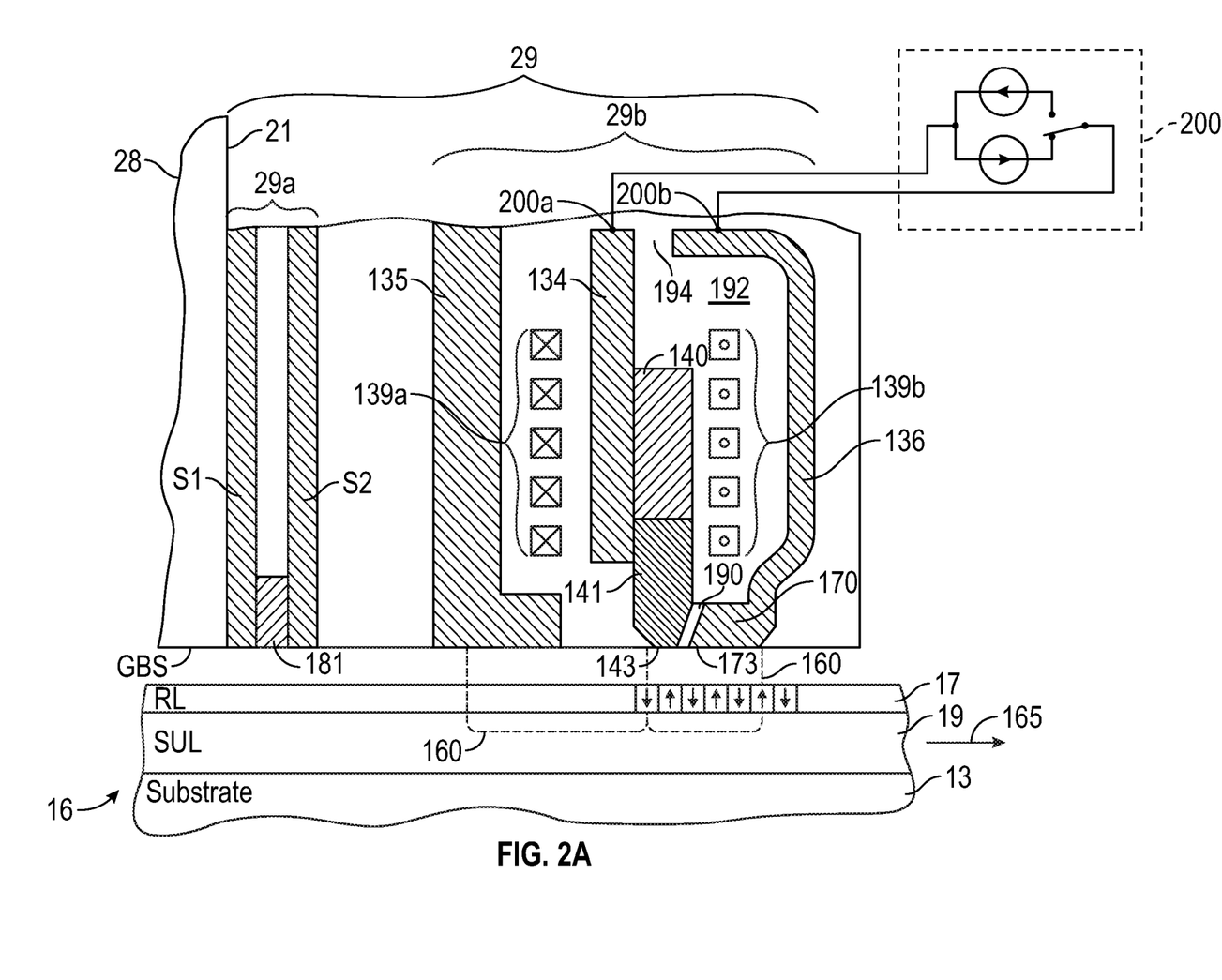
FIG. 2A is a side sectional view (not to scale) of a perpendicular magnetic recording write head with a non-magnetic electrically-conductive layer incorporated in the write gap according to embodiments of the invention, a read head and a recording disk taken through a central plane that intersects a data track on the disk.

FIG. 2A is a side sectional view (not to scale) of a perpendicular magnetic recording write head with an electrically-conductive layer 190 incorporated in the write gap, a read head and a recording disk taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 that has a disk-facing or gas-bearing surface (GBS) and includes read head 29a and write head 29b. Read head 29a includes a magnetoresistive (MR) read element or sensor 181 located between two magnetic shields S1, S2. The current-assisted write head 29b is a perpendicular magnetic recording (PMR) write head and includes a yoke structure with main pole 134, write pole 140 with flared portion 141 and disk-facing end 143, optional first flux return pole 135, second flux return pole 136, trailing magnetic shield 170 with disk-facing end 173, and conductive layer 190. The electrically-conductive layer 190 may be formed of a non-magnetic metal like Cu, Au, Ru, Cr, W, Mo, Pt or Rh or their alloys. The conductive layer 190 is preferably non-magnetic, and if it is the only layer in the write gap it is required to be non-magnetic. The main pole 134, write pole 140, return poles 135, 136 and trailing shield 170 are formed of ferromagnetic materials, typically alloys of one or more of Co, Fe and Ni. The write pole 140 is typically formed of a high-moment CoFe alloy.

The write head 29b also includes a thin film coil 139a, 139b shown in section around main pole 134. The write coil 139a, 139b is a helical coil wrapped around main pole 134, but the write coil may also be a conventional dual "pancake" coil in which all the coil sections are in substantially the same plane and wrapped around the yoke. A flared write pole 140 is part of the main pole 134 and has a flared portion 141 and a pole tip with an end 143 that faces the outer surface of disk 16. Write current through coil 139a, 139b induces a magnetic field (shown by dashed line 160) from the write pole 140 that passes through the RL 17 (to magnetize the region of the RL 17 beneath the write pole end 143), through the flux return path provided by the SUL 19, and back to the end of optional first return pole 135 and end 173 of trailing shield 170.

The write head 29b also includes electrical circuitry 200 electrically connected to the main pole 134 and the second return pole 136. The circuitry 200 may include a voltage or current source (or a connection to an external voltage or current source) and one or more switching devices, such as transistors or relays that can switch the voltage or current on and off. The circuitry 200 is configured to provide a current or voltage to the main pole 134 and the return pole 136. For example, the circuitry 200 may provide a current between the main pole 134 and the return pole 136/trailing shield 170 that flows through write pole 141 and conductive layer 190 in the write gap between the write pole 141 and trailing shield 170. The current through conductive layer 190 generates an Ampere field substantially orthogonal to the magnetic flux in write pole 140 to facilitate the reversal or switching of the magnetization of write pole 140 during writing. An insulating material portion 192 (for example alumina) is provided around the magnetic coil between the main pole 134, the trailing shield 170 and the return pole 136. An electrically insulating material layer 194 (for example alumina) can be provided between end portions of the main pole 134 and the return pole 136 where the circuitry connections (i.e., electrical contacts 200a, 200b attached to the ends of the main pole 134 and return pole 136, respectively) are made (i.e., distal from the GBS).

The read/write head 29 is typically formed as a series of thin films deposited on a trailing surface 21 of gas-bearing slider 28 that has its GBS supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the direction indicated by arrow 165, so the portion of slider 28 that supports the read head 29a and write head 29b is often called the slider "trailing" end, and the surface 21 perpendicular to the slider GBS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

Figure 2B:
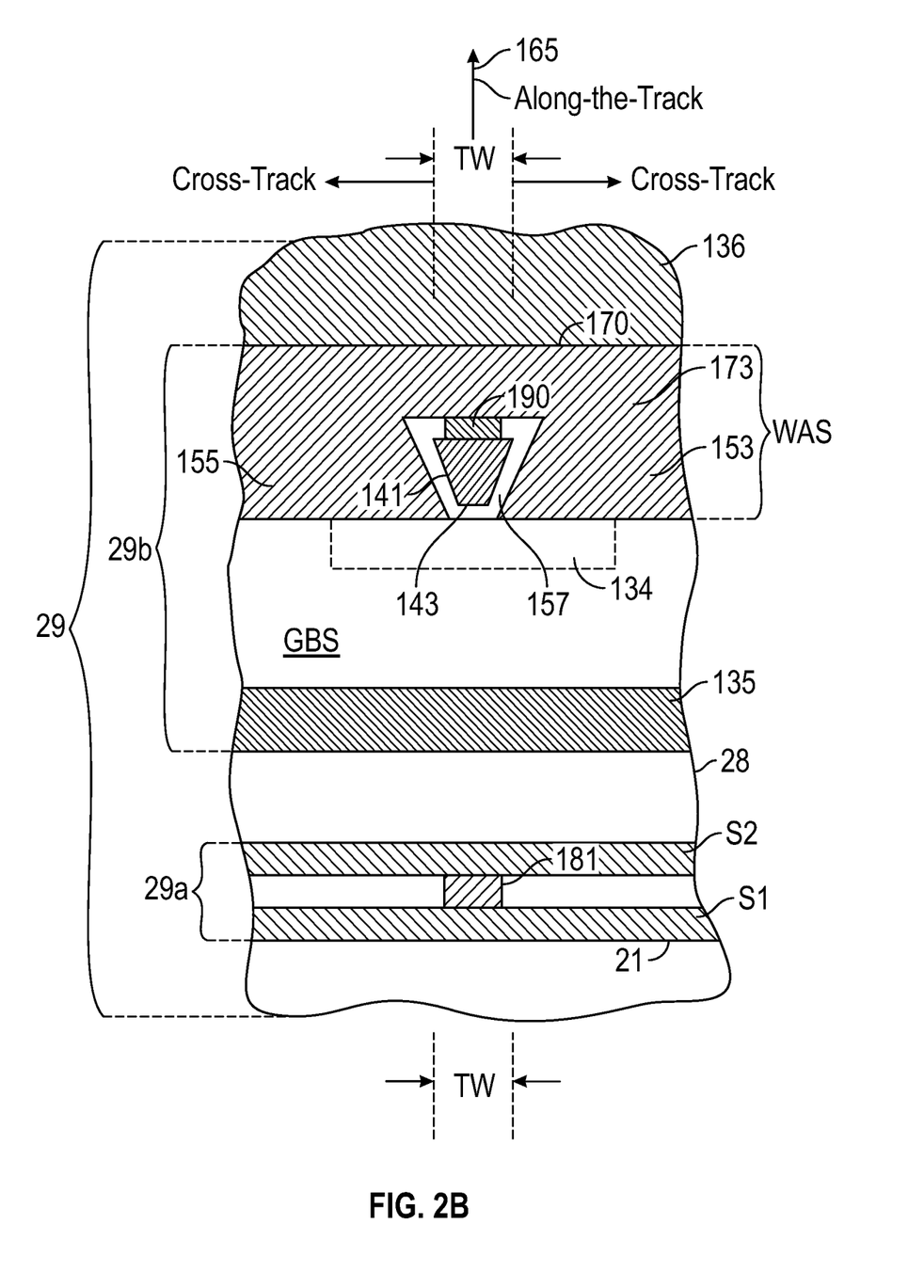
FIG. 2B is a view (not to scale) that illustrates the read head and current-assisted write head according to embodiments of the invention as seen from the disk.

FIG. 2B is a view (not to scale) that illustrates the read head 29a and current-assisted write head 29b as seen from the disk 16. The GBS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 165, which is called the along-the-track direction. The direction perpendicular to direction 165 and parallel to the plane of the GBS is called the cross-track direction. The width of the end 143 of write pole 141 in the cross-track direction substantially defines the track-width (TW) of the data tracks in the RL 17 (FIG. 2A). The main pole 134 is shown with dashed lines because it is recessed from the GBS (see FIG. 2A).

The portions identified as 153, 155 on opposite ends of trailing shield 170 are side shields that together with trailing shield 170 form a wraparound shield (WAS) that generally surrounds the write pole end 143. The shields 170, 153, 155 all have ends substantially at the recording-layer-facing surface, as shown by trailing shield end 173. The shields 170, 153, 155 are formed as a single-piece structure to form the WAS that substantially surrounds the write pole end 143 and are thus formed of the same material, typically a NiFe, CoFe or NiFeCo alloy, so that they have the same alloy composition. The side shields 153, 155 are separated from write pole end 143 by nonmagnetic electrically-insulative gap material 157. The non-magnetic electrically conductive layer 190 is in the write gap between the write pole end 143 and the trailing shield 170. The WAS alters the angle of the write field and improves the write field gradient at the point of writing, and shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the trailing shield 170.

Figure 3A:
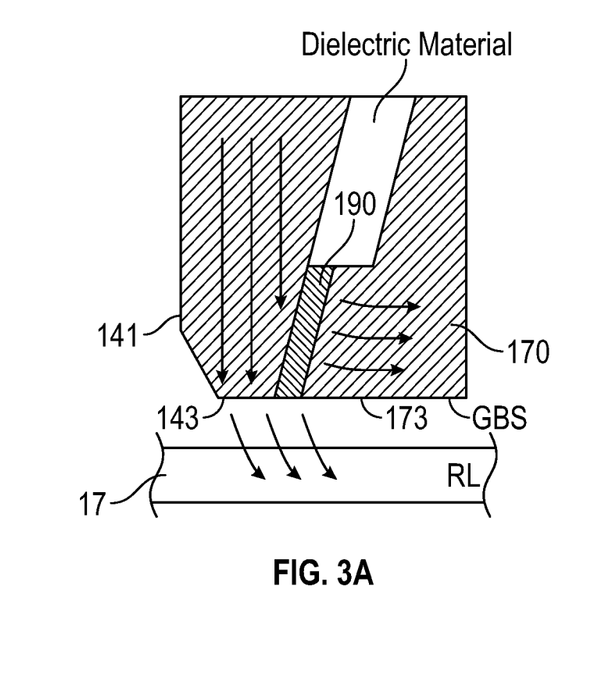
FIG. 3A is an illustration of the magnetic flux lines from the write field in the write pole that are directed substantially perpendicularly toward the recording layer and through the trailing shield when write current is directed through the write coil.
Figure 3B:
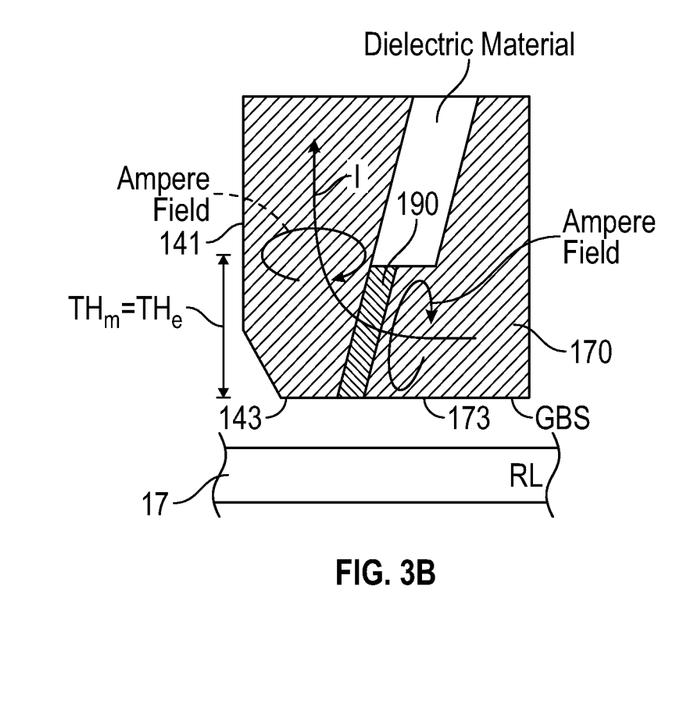
FIG. 3B is an illustration of the electrical current from the trailing shield through the electrically-conductive layer in the write gap to the write pole that generates an Ampere field that assists the switching of the magnetization of the write pole.

The general operation of the current-assisted write head with an electrically-conductive layer in the write gap will be explained with the side sectional views of FIGS. 3A-3B. In FIG. 3A, a magnetic write field in write pole 141 is directed substantially perpendicularly toward the RL 17 and into the trailing shield 170 when write current is directed through coil 139a, 139b (FIG. 2A). The arrows in FIG. 3A represent the magnetic flux from the write field. Simultaneously, as shown in FIG. 3B, electrical current from circuitry 200 (FIG. 2A) passes from trailing shield 170 through conductive layer 190 to write pole 141 (or alternatively from write pole 141 to trailing shield 170). According to Ampere's law, this current will produce a circular magnetic field that is in the direction substantially transverse to the direction of current flow. Since the current direction is in substantially the same direction as the magnetic flux, or magnetization in write pole 141, this Ampere field is also transverse to the magnetization of the write pole 141. This produces a transverse magnetization component with respect to the flux flow direction in the write pole 141. This creates a torque on the write pole magnetization that makes the flux reversal in the write pole faster. This increase in magnetization reversal or switching of the write pole, which is required for high-speed writing, enables an increase in disk areal data density.

In addition to the current induced Ampere field inside the write head that makes the magnetization switching faster, the Ampere field also has other non-limiting benefits. One benefit is that the Ampere field can change the magnetization direction of the write pole and the trailing shield near the write gap, such that the flux shunt from the write pole into the trailing shield is reduced, leading to higher field (thus higher overwrite) in the recording layer. Another benefit is that the recording layer will also experience this Ampere field.

Referring to FIG. 3B, the magnetic throat height ($TH_m$) is substantially the thickness of the write pole at the write gap (or the trailing shield at the write gap) as measured from the GBS to an end recessed from the GBS, while the electrical throat height ($TH_e$) is substantially the height of the conductive layer 190 as measured from the GBS to an end recessed from the GBS. In the embodiment of the write head shown in FIGS. 3A-3B, $TH_m$ is substantially equal to $TH_e$.

Figure 4:
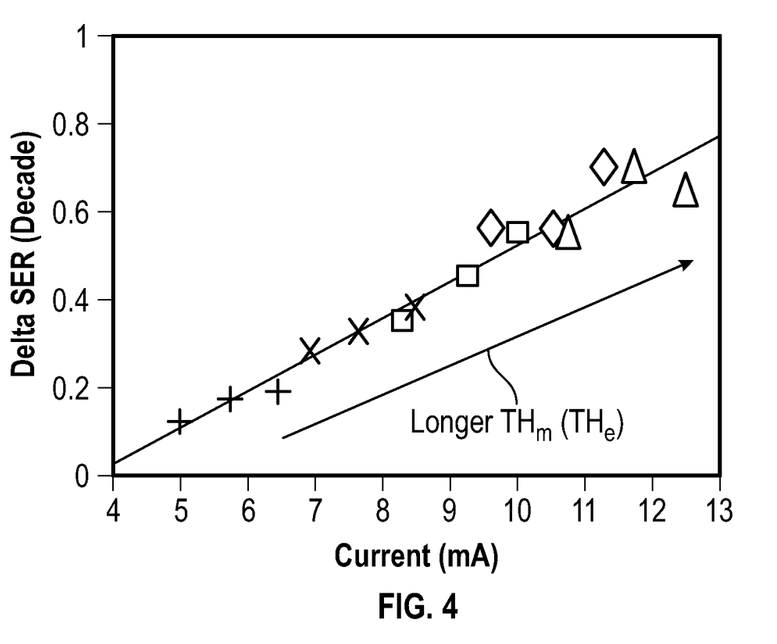
FIG. 4 is a graph of soft error rate (SER) improvement (delta SER) of a data track recorded with a write head having its magnetic throat height equal to its electrical throat height.

It has been discovered that the signal-to-noise ratio (SNR) of the readback signal and the soft error rate (SER) of the recorded data can be improved by embodiments of the invention with an improved write gap structure wherein $TH_e$ is greater than $TH_m$. FIG. 4 is a graph of soft error rate (SER) improvement (delta SER) of a data track recorded with a write head having $TH_m$ equal to $TH_e$ (the write gap structure of FIGS. 3A-3B) for different throat heights. The voltage from circuitry 200 (FIG. 2A) was constant, thus a longer electric throat height $TH_e$ with lower resistance has higher current. This shows that longer electrical $TH_e$ is desired to allow higher current, and in turn higher performance gain. However, it has also been shown that for better base performance a shorter magnetic throat height $TH_m$ is desired. Thus in embodiments of this invention, the current-assisted write head has a write gap structure wherein $TH_e$ is greater than $TH_m$.

Figure 5A:
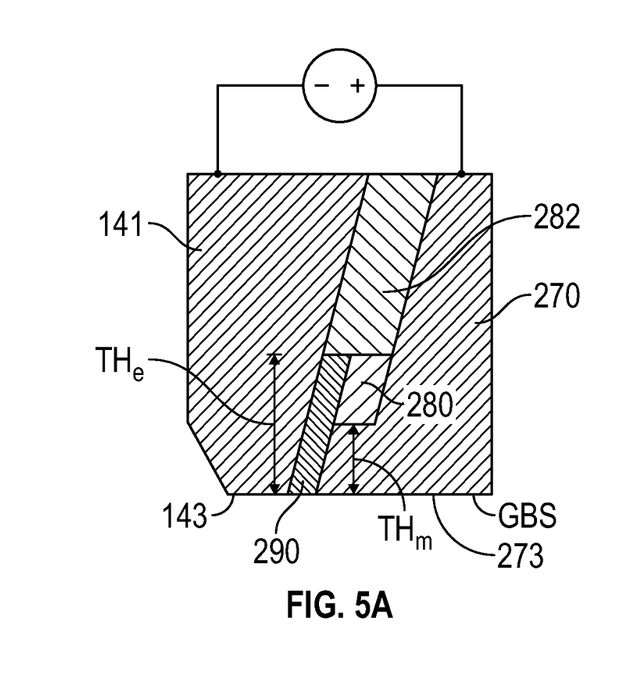
FIG. 5A is a sectional view of a write pole and trailing shield with an improved write gap structure according to one embodiment of the invention.

FIG. 5A is a sectional view of a write pole and trailing shield with an improved write gap structure according to one embodiment of the invention. The current-assisted write head has electrical current flowing between the write pole 141 and the trailing shield 270. The magnetic throat height ($TH_m$) and the electric throat height ($TH_e$) are decoupled, i.e., $TH_m$ is shorter than $TH_e$. The short $TH_m$ maximizes the base writer performance, while the longer $TH_e$ maximizes the current-induced performance gain. The back or recessed region of the trailing shield 270 at the write gap is a non-magnetic electrically-conductive spacer 280, so that the electrical current will flow through conductive layer 290 over the distance defined by $TH_e$. However, $TH_m$ is defined only by the portion of trailing shield 270 from the end 273 to the recessed end in contact with spacer 280. The portion of the write gap recessed from conductive layer 290 and spacer 280 is dielectric material 282, for example alumina. The conductive layer 290 and the non-magnetic spacer 280 can be either the same or different materials, such as Cu, Au, Ru, Cr, W, Mo, Pt, Rh or their alloys. Materials with lower resistivity are preferred, because the lower resistance allows higher current for better performance, and lower Joule heating for better write head reliability. The magnetic throat height is preferably between 20 to 50 nm and the electrical throat height is preferably between 60 and 150 nm. The conductive layer 290 may have a thickness in the range of 10 to 40 nm. For these ranges of dimensions for the conductive layer, and with current through the conductive layer in the range of 10 to 50 mA, an Ampere field in the range of 50 to 500 Oe can be generated.

Figure 5B:
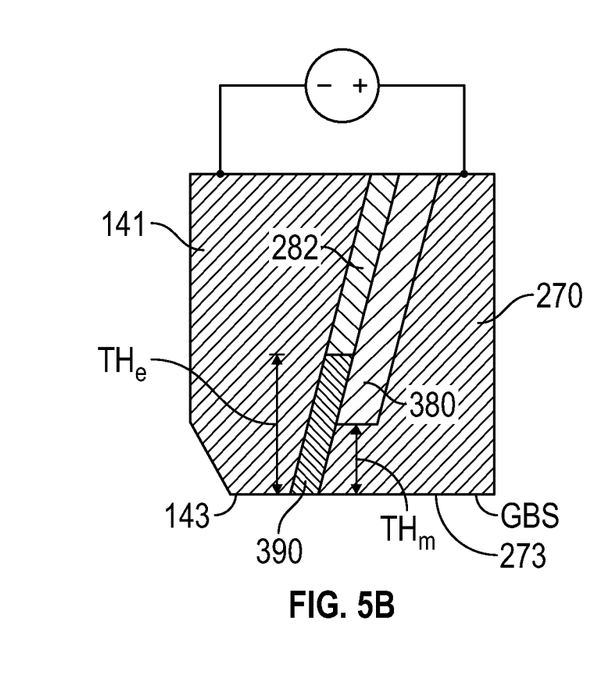
FIG. 5B is a sectional view of a write pole and trailing shield with an improved write gap structure according to another embodiment of the invention.

FIG. 5B is a sectional view of a write pole and trailing shield with an improved write gap structure according to another embodiment of the invention. In this embodiment, unlike the embodiment of FIG. 5A, the back or recessed end of spacer 380 is not aligned with the back or recessed end of conductive layer 390. Instead the spacer 380 can extend further back, e.g., up to 3 microns, because the current path will be confined by $TH_e$ that is defined by the conductive layer 390.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording write head for magnetizing data tracks in a magnetic recording disk, the write head comprising:
    a write pole formed of ferromagnetic electrically-conductive material and having an end for facing the disk;
    a trailing shield formed of ferromagnetic electrically-conductive material and having an end for facing the disk, the write pole end and trailing shield end being spaced apart to define a write gap, a height of the trailing shield from the trailing shield end to an end recessed from the trailing shield end being a magnetic throat height, wherein a surface of the trailing shield end is substantially parallel to a surface of the trailing shield recessed end;
    an electrically-conductive layer in the write gap, a height of the electrically-conductive layer from the write pole end to an end recessed from the write pole end being an electrical throat height, wherein the electrical throat height is greater than the magnetic throat height; and
    wherein the write pole and trailing shield are adapted to pass electrical current through the write gap.

2. The head of claim 1 further comprising a spacer of non-magnetic electrically-conductive material in contact with the trailing shield recessed end and said electrically-conductive layer.

3. The head of claim 2 wherein said electrically-conductive layer and said conductive spacer are each comprised of a material selected from Cu, Au, Ru, Cr, W, Mo, Pt, Rh and alloys thereof.

4. The head of claim 1 further comprising dielectric material in the write gap in a region recessed from the write pole end and trailing shield end.

5. The head of claim 1 wherein the magnetic throat height is equal to or greater than 20 nm and less than or equal to 50 nm and the electrical throat height is equal to or greater than 60 nm and less than or equal to 150 nm.

6. The head of claim 1 further comprising electrical circuitry connected to the write pole and the trailing shield.

7. A magnetic recording disk drive comprising:
    the write head of claim 6; and
    a rotatable magnetic recording disk having a perpendicular magnetic recording layer with data tracks.

8. The head of claim 1 further comprising a spacer of non-magnetic electrically-conductive material, the spacer having a first end in contact with the trailing shield recessed end and a second end aligned with the electrically-conductive layer recessed end.

9. The head of claim 1 further comprising a spacer of non-magnetic electrically-conductive material, the spacer having a height greater than the height of the electrically-conductive layer.

10. The head of claim 1 further comprising dielectric material in contact with the electrically-conductive layer recessed end, wherein the dielectric material has a width from the trailing shield to the write pole that is greater than a width of the electrically-conductive layer.

11. The head of claim 1 further comprising dielectric material in contact with the electrically-conductive layer recessed end, wherein the dielectric material has a width between the trailing shield and the write pole that is substantially equal to a width of the electrically-conductive layer.

12. A magnetic recording disk drive write head for magnetizing regions in data tracks of a magnetic recording layer on a disk, the write head being formed on a slider having a gas-bearing surface (GBS), the write head comprising:
    a write pole formed of ferromagnetic electrically-conductive material and having an end substantially at the GBS;
    a trailing shield formed of ferromagnetic electrically-conductive material and having an end substantially at the GBS, the write pole end and trailing shield end being spaced apart to define a write gap, the trailing shield at the write gap having a height from the GBS end to an end recessed from the GBS, wherein a surface of the end of the trailing shield substantially at the GBS is substantially parallel to a surface of the end of the trailing shield recessed from the GBS;
    a return pole formed of ferromagnetic electrically-conductive material and coupled to the trailing shield;
    an electrical coil coupled to the write pole and return pole for generating a magnetic write field in the write pole;
    a non-magnetic electrically-conductive layer in the write gap and having a height from the GBS to an end recessed from the GBS, the conductive layer height being greater than the height of the trailing shield at the write gap;
    a non-magnetic electrically-conductive spacer in the write gap in contact with the recessed end of the trailing shield; and
    an electrical circuit coupled to the write pole and the trailing shield for directing current through the conductive layer in the write gap.

13. The head of claim 12 wherein the electrically-conductive layer height is an electrical throat height of the write head and the height of the trailing shield at the write gap is a magnetic throat height of the write head.

14. The head of claim 13 wherein the magnetic throat height is equal to or greater than 20 nm and less than or equal to 50 nm and the electrical throat height is equal to or greater than 60 nm and less than or equal to 150 nm.

15. The head of claim 12 further comprising dielectric material in the write gap in a region recessed from the write pole end and trailing shield end.

16. The head of claim 12 wherein said electrically-conductive layer and said conductive spacer are each comprised of a material selected from Cu, Au, Ru, Cr, W, Mo, Pt, Rh and alloys thereof.

17. A magnetic recording disk drive comprising:
    the write head of claim 12; and
    a rotatable magnetic recording disk having a perpendicular magnetic recording layer with data tracks.

18. The head of claim 12 further comprising a spacer of non-magnetic electrically-conductive material, the spacer having a first end in contact with the end of the trailing shield recessed from the GBS recessed and a second end aligned with the end of the electrically-conductive layer recessed from the GBS.

19. The head of claim 12 further comprising a spacer of non-magnetic electrically-conductive material, the spacer having a height greater than the height of the electrically-conductive layer.

20. The head of claim 12 further comprising dielectric material in contact with the end of the electrically-conductive layer recessed from the GBS, wherein the dielectric material has a width from the trailing shield to the write pole that is substantially equal to or greater than a width of the electrically-conductive layer.

* * * * *